(12) United States Patent
Janisch

(10) Patent No.: US 7,072,188 B2
(45) Date of Patent: Jul. 4, 2006

(54) POWER DISTRIBUTION MODULE FOR PERSONAL RECREATIONAL VEHICLE

(75) Inventor: Darrel Janisch, Thief River Falls, MN (US)

(73) Assignee: Arctic Cat Inc., Thief River Falls, MN (US)

(*) Notice: Subject to any disclaimer, the term of this patent is extended or adjusted under 35 U.S.C. 154(b) by 0 days.

(21) Appl. No.: 10/283,427

(22) Filed: Oct. 29, 2002

(65) Prior Publication Data

US 2004/0080923 A1 Apr. 29, 2004

(51) Int. Cl.
H02B 13/00 (2006.01)
H01R 12/00 (2006.01)
H05K 7/02 (2006.01)

(52) U.S. Cl. .............. 361/826; 361/822; 361/823; 361/833; 361/837; 439/76.2; 174/52.1

(58) Field of Classification Search ............ 174/50, 174/52.1; 361/752, 728, 730, 822, 826, 833, 361/837, 827, 823; 439/76.1, 76.2

See application file for complete search history.

(56) References Cited

U.S. PATENT DOCUMENTS

| | | | | |
|---|---|---|---|---|
| 4,940,419 A * | 7/1990 | Kurita et al. | ............... | 439/271 |
| 5,515,988 A * | 5/1996 | Oda | ............ | 220/3.8 |
| 5,532,431 A * | 7/1996 | Saka et al. | ............... | 174/52.3 |
| 5,587,890 A * | 12/1996 | Happ et al. | ............... | 361/826 |
| 5,703,757 A * | 12/1997 | Hayes et al. | ............... | 361/752 |
| 5,864,091 A * | 1/1999 | Sumida | ............... | 174/50 |
| 5,903,445 A * | 5/1999 | Nakamura et al. | ............... | 361/833 |
| 6,077,102 A * | 6/2000 | Borzi et al. | ............... | 439/364 |
| 6,108,202 A * | 8/2000 | Sumida | ............... | 361/690 |
| 6,121,548 A * | 9/2000 | Matsuoka | ............... | 174/59 |
| 6,354,868 B1* | 3/2002 | Korczynski et al. | ............... | 439/516 |
| 6,424,520 B1* | 7/2002 | Cornell et al. | ............... | 361/648 |
| 6,496,377 B1* | 12/2002 | Happ et al. | ............... | 361/739 |
| 6,545,217 B1* | 4/2003 | Sato | ............... | 174/50 |
| 6,629,619 B1* | 10/2003 | Sato et al. | ............... | 220/4.02 |
| 6,850,421 B1* | 2/2005 | Boyd | ............... | 361/833 |
| 2003/0184988 A1* | 10/2003 | Boyd | ............... | 361/833 |

* cited by examiner

*Primary Examiner*—Kamand Cuneo
*Assistant Examiner*—Dameon E. Levi
(74) *Attorney, Agent, or Firm*—Black Lowe & Graham, PLLC

(57) ABSTRACT

A power distribution module for a personal recreational vehicle includes a housing and a cover. The housing defines an interior and includes a wall having an array of receptacle openings. The receptacle openings are adapted to receive and secure electrical components inside the housing. A distribution harness includes a plurality of electrical conductors and is coupled to the housing wherein the electrical conductors are in electrical communication with the electrical components inside the housing. The power distribution module can optionally include a decal to assist quick and accurate placement of the electrical components during the manufacturing process. A method for producing a personal recreational vehicle having a standardized housing over a range of models. The housing includes a component arrangement guide for locating and installing electrical components.

23 Claims, 6 Drawing Sheets

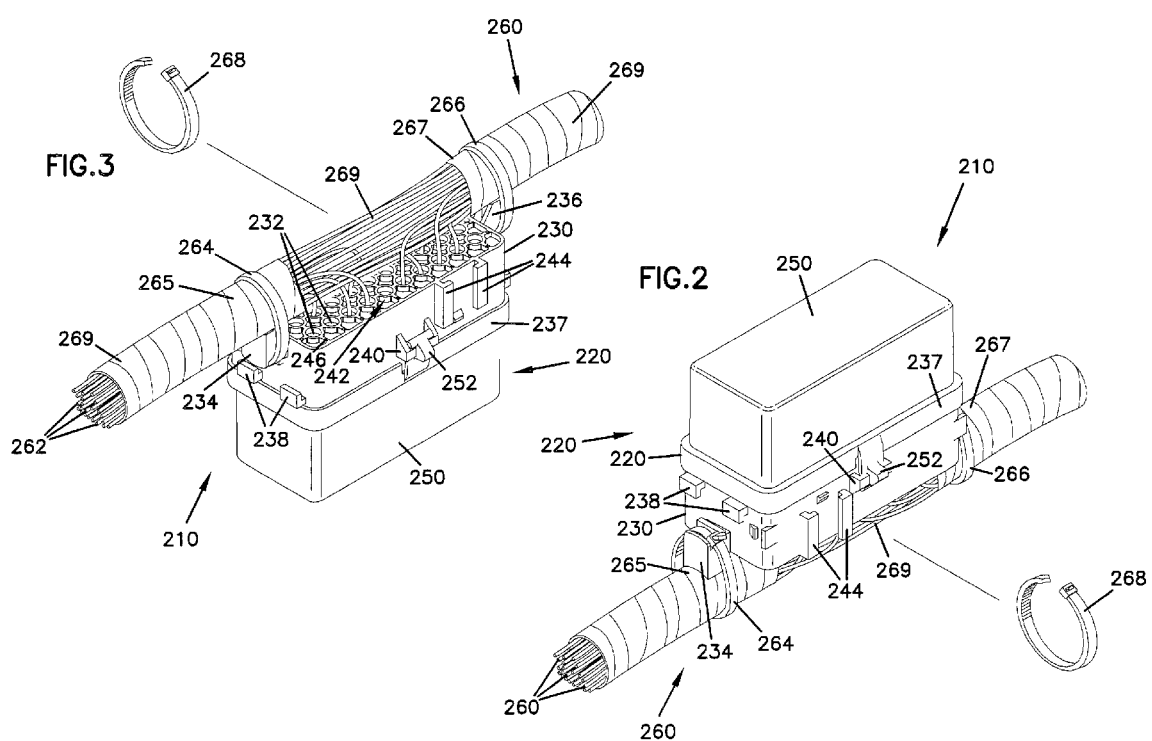

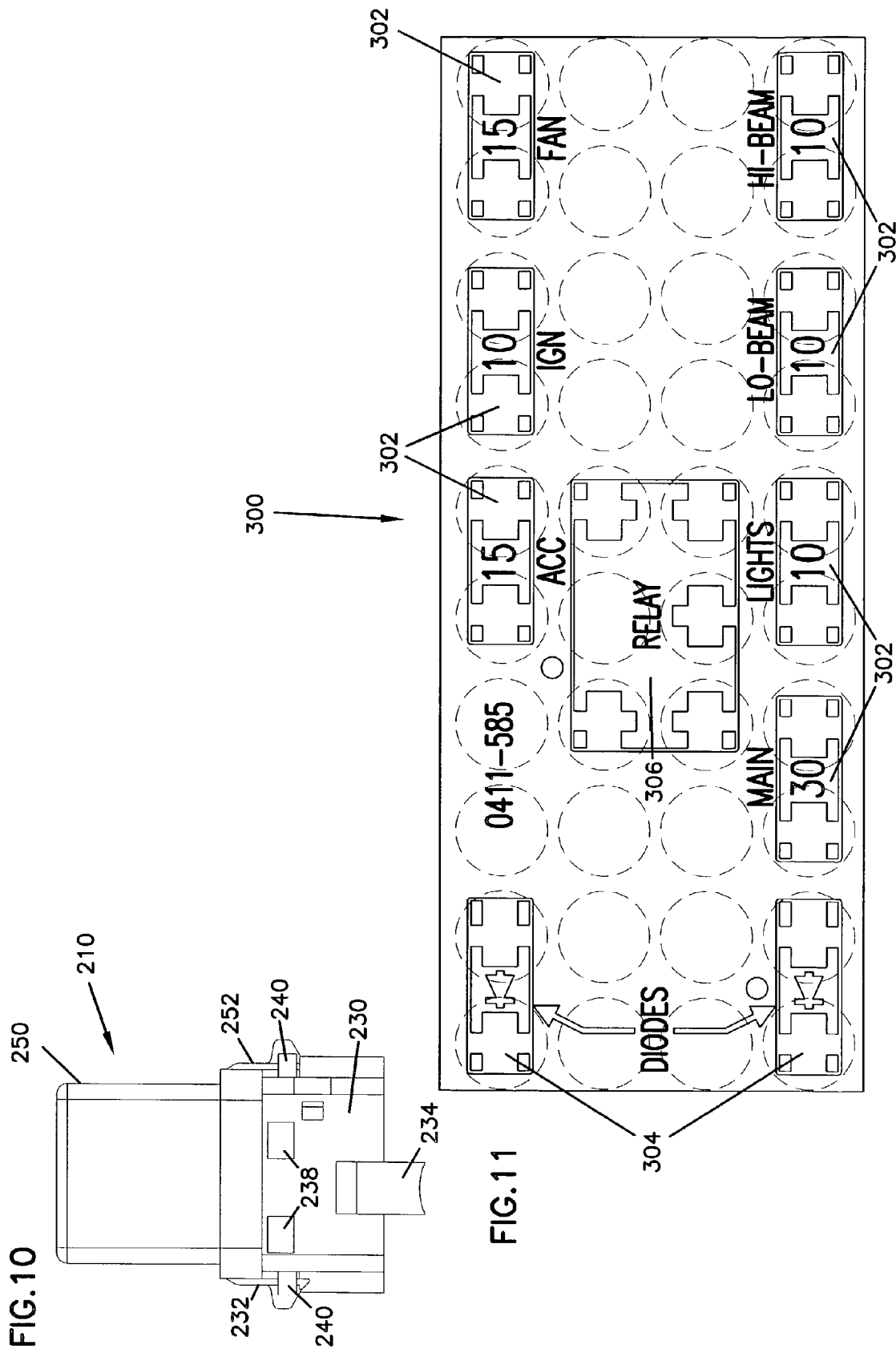

POWER DISTRIBUTION MODULE FOR PERSONAL RECREATIONAL VEHICLE

FIELD OF THE INVENTION

The invention relates generally to personal recreational vehicles, and more particularly to a power distribution module for use with engines that power personal recreational vehicles.

BACKGROUND OF THE INVENTION

Personal recreational vehicles, such as snowmobiles and ATVs, are used by millions of people for sport and fun. To illustrate, snowmobiling is a sport enjoyed by individuals of all ages and walks of life. Although interest in snowmobiling has traditionally been considerable, in recent years the sport has seen its popularity soar. For example, according to the International Snowmobile Manufacturers Association, about 82,000 snowmobiles were sold in the United States in 1992. By 1997, that number topped 170,000 units.

Similarly, the number of Americans driving off-road vehicles such as ATVs increased from 19.4 million in 1983 to 27.9 million in 1995. The increase in use of personal recreational vehicles is partly due to technological advancements of the equipment, advances that have made use safer and easier for persons of differing levels of ability.

For example, snowmobiles have become more comfortable, responsive and maneuverable, resulting in a more pleasing and exciting riding experience for the driver. One advancement of particular importance is the improvement in the maneuverability and stability of snowmobiles. As these characteristics have advanced, a greater number of individuals have been drawn to the sport. The industry has kept pace with the growth in the sport by expanding the number of models available across a range of prices. ATVs have seen similar types of changes and improvements.

The growing popularity of personal recreational vehicles puts an increased demand on manufacturers to reduce cost of the vehicles. One way manufacturers can reduce cost is to standardize components, both within and across a product line. Standardization reduces manufacturing cycle time as well as cost.

All personal recreational vehicles include some type of power distribution system for routing and control of power and signals throughout the vehicle. The power distribution system usually includes a fuse box, with individual fuses blowing when the fuse rated power is exceeded. Other components such as diodes and relays are housed in other locations.

For the reasons stated, it is desirable to devise a means by which the power distribution module can be easily standardized for manufacturing. Additionally, it is also desirable to have a power distribution module that includes components other than fuses.

SUMMARY OF THE INVENTION

Against this backdrop, the invention has been created. One aspect of the present invention is directed to a power distribution module for a personal recreational vehicle. The power distribution module includes a housing defining an interior and including a component attachment portion and a cover. The housing further includes a plurality of receptacle openings in a wall in the component attachment portion, and the receptacle openings are spaced-apart and adapted for receiving and securing electrical components within the housing. The power distribution module further includes a distribution harness having a plurality of electrical conductors, wherein the electrical conductors electrically cooperate with the receptacle openings to connect to the electrical components, and the conductors are adapted to distribute power.

Another aspect of the present invention is directed to a personal recreational vehicle having an electrical distribution system for distributing electrical signals and power. The electrical distribution system includes a power distribution module, wherein at least a portion of the electrical signals and power passes through the power distribution module. The power distribution module includes a housing having a plurality of receptacle openings in a wall, and the receptacle openings are spaced-apart in an array and adapted for receiving electrical components. The power distribution module also includes a distribution harness having a plurality of electrical conductors, and the electrical conductors electrically cooperate with the receptacle openings for receiving electrical components.

Another aspect of the invention is directed to a power distribution system for a personal recreational vehicle including a distribution harness for distributing power and electrical signals adapted to be connected to electrical components; and means for connecting the distribution harness to the electrical components.

BRIEF DESCRIPTION OF THE DRAWINGS

FIG. 2 is a perspective view of an example of an embodiment of a power distribution module of the present invention.

FIG. 3 is a perspective view from the opposite side of the power distribution module of FIG. 2.

FIG. 10 is an end view of the component attachment module of FIG. 7.

FIG. 11 is a schematic of a decal indicating the layout of electrical components for use in a power distribution module having a 4 by 10 array of receptacle openings in accordance with an example embodiment of the present invention.

DETAILED DESCRIPTION OF THE INVENTION

In general, the present disclosure discusses a power distribution module for use in a vehicle. The power distribution module tile is capable of being made water-resistant and opens and closes using a one-handed operation, and includes other desirable properties.

Figure 1:
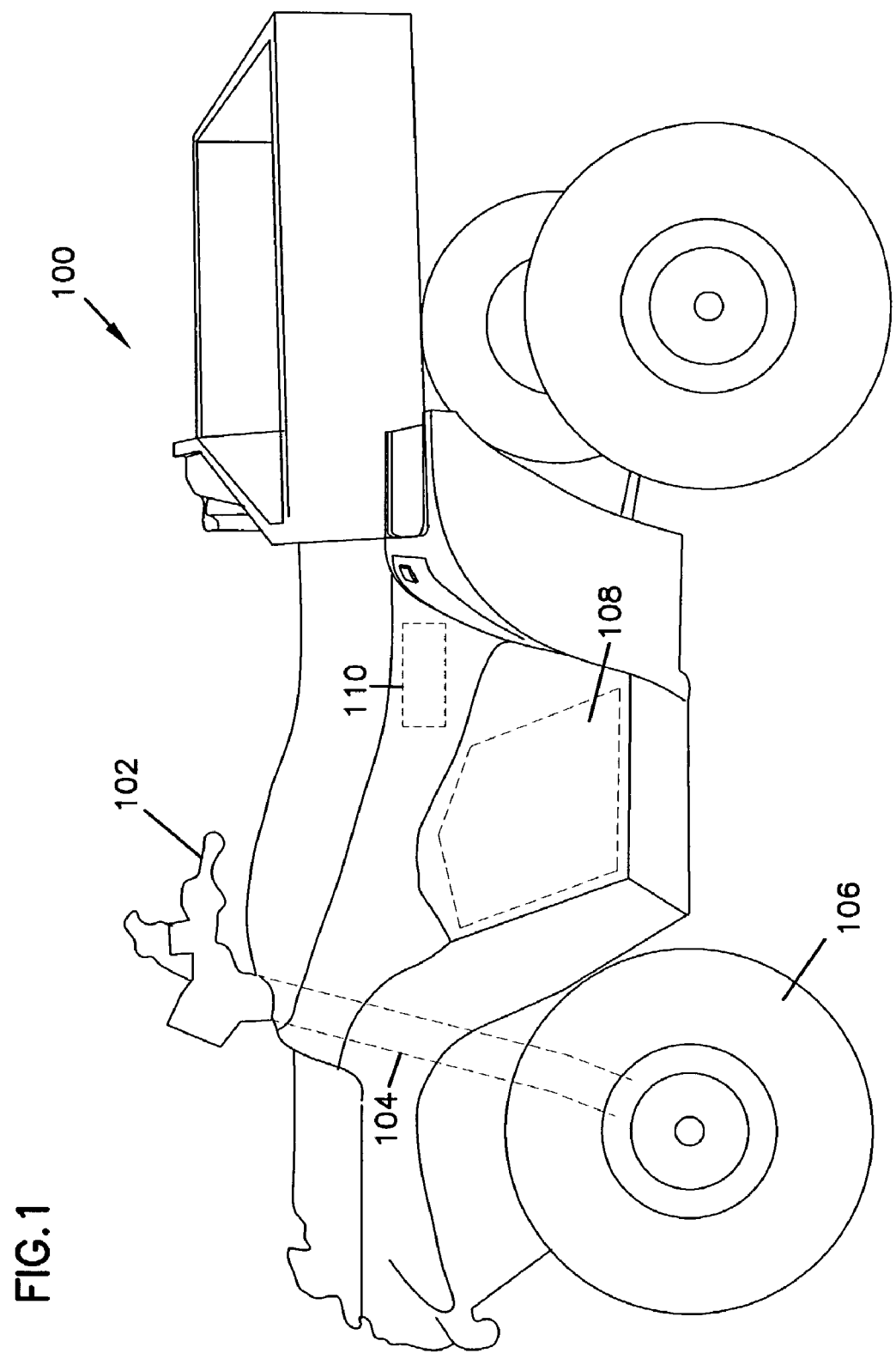
FIG. 1 depicts an ATV incorporating an example embodiment of the power distribution module of the present invention.
Figure 5:
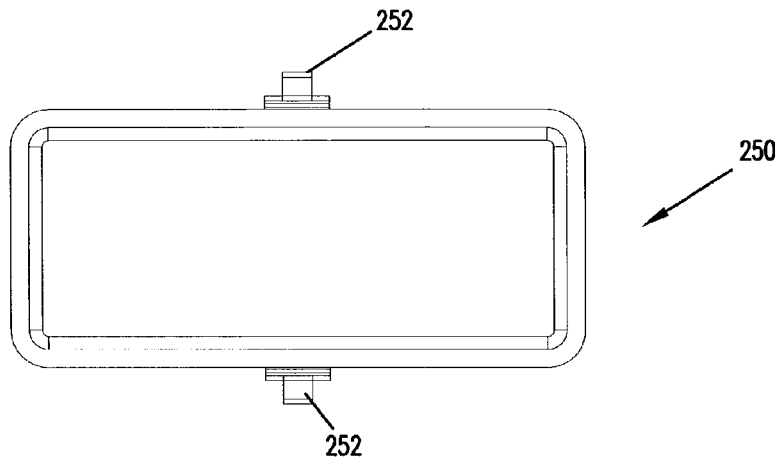
FIG. 5 is a top view of the cover of FIG. 4.
Figure 4:
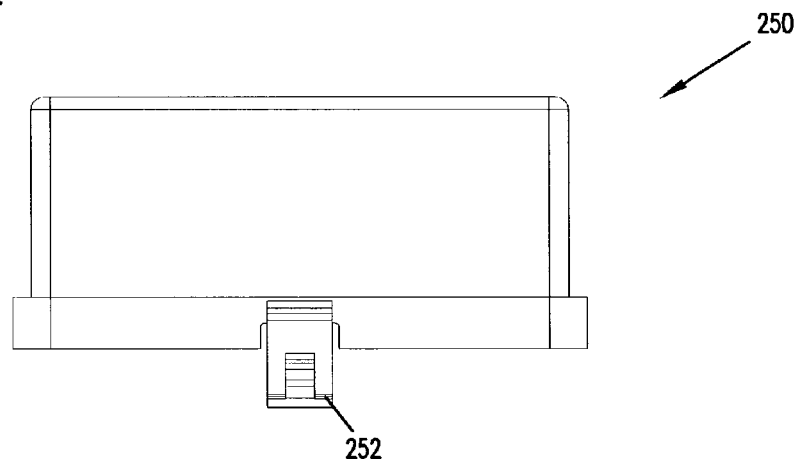
FIG. 4 is an elevational view of the cover for a power distribution module shown in FIGS. 2 and 3.
Figure 6:
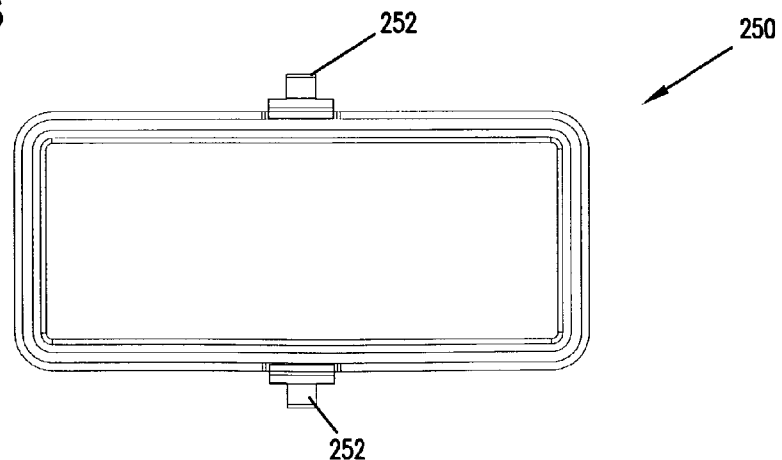
FIG. 6 is a bottom view of the cover of FIG. 4.
Figure 8:
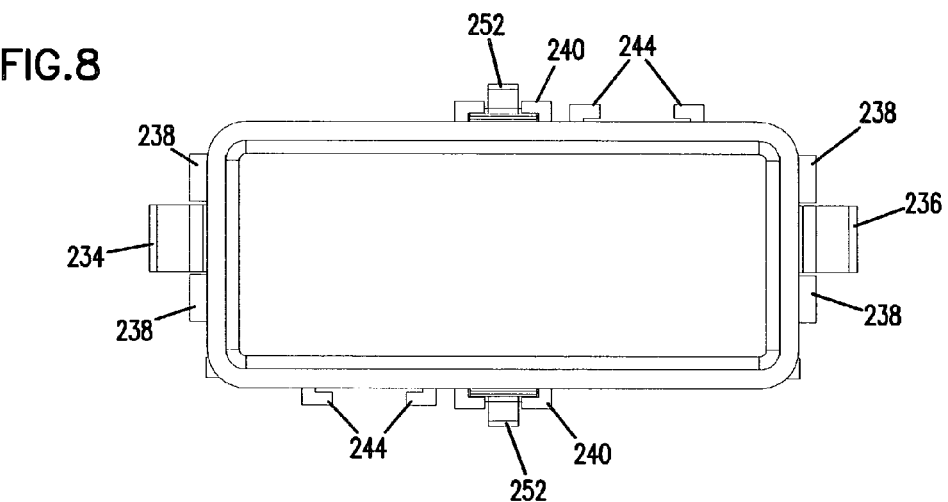
FIG. 8 is a top view of the power distribution module of FIG. 7.
Figure 7:
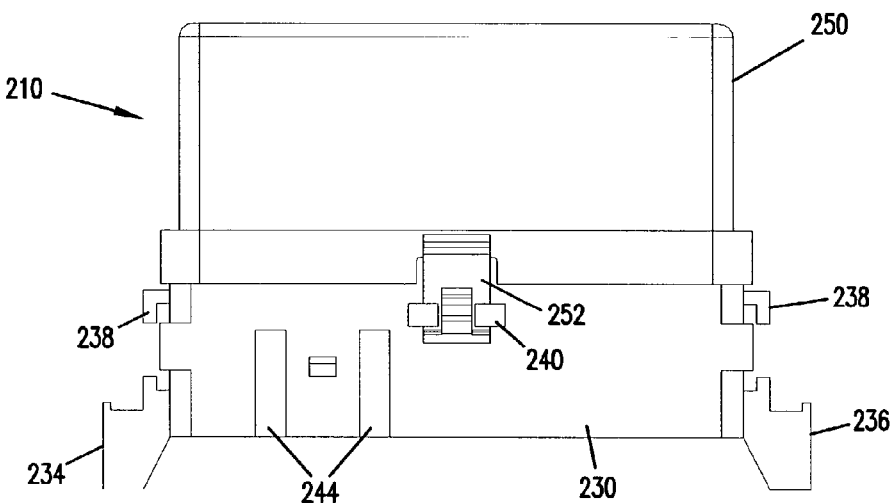
FIG. 7 is an elevational view of the power distribution module shown in FIGS. 2 and 3.

FIG. 1 depicts an ATV 100 with a steering mechanism 102 that controls the orientation of a set of front wheels 106 via a steering shaft 104. The steering shaft 104 couples the steering mechanism 102 with the front wheels 106 via tie rods (not shown) that connect the steering shaft 104 to the suspension system (not shown) of the front wheels 106. The details regarding the coupling of the steering shaft 104 and the suspension system for the wheels 106 vary from ATV to ATV and are known and are not the focus of the present invention. Therefore, they are not discussed further. As the steering mechanism 102 is turned, the front wheels 106 also turn, thereby controlling the direction in which the ATV 100 moves. An engine 108 is mounted toward the front of the chassis of the ATV 100. The engine provides power to the drive train (not shown) of the ATV 100. The details of the drive train vary from ATV to ATV, but according to the present invention, the ATV will have a power distribution module 110 to control the flow of power and electrical signals. The power distribution module will typically be located on a portion of the frame of the ATV near the engine compartment. However, the location can vary depending on the ATV. Similarly, the power distribution module of the present disclosure can be used on a snowmobile, and its use and placement are dictated by considerations similar to those in using the power distribution in an ATV.

Referring generally to FIGS. 2–10, an example of an embodiment of a power distribution module 210 of the present invention is shown. Power distribution module 210 is adapted for housing and securing electrical components to protect them from inclement operating conditions. Power distribution module 210 includes a housing 220, the housing 220 defining an interior, and a distribution harness 260. The housing 220 includes a component attachment portion 230 adapted to receive and hold electrical components (not shown). Electrical components are held in place in receptacle openings 232 in a wall 231 of the housing 220. The receptacle openings 232 are spaced apart and adapted to receive and secure electrical components within the housing, as will be discussed further.

In the example embodiment shown, the housing 220 includes a component attachment portion 230 and a removable cover 250. Preferably, when the cover 250 is removably secured to the component attachment portion 230 of the housing 220, a waterproof seal is formed, keeping the electrical components protected in the interior of the housing 220 free from condensation or other aqueous materials, such as oil or mud, that can cause the electrical components to have a shortened life or fail. One of skill in the art will recognize that many modifications could be made to make the housing waterproof, such as a lip and a gasket.

A latch 252 on the cover 250 may engage with a catch 240 on the component attachment portion 230 to removably secure the cover 250 in place. An advantage of the example embodiment shown is that a user can remove the cover 250 from the component attachment portion 230 using only one hand, as will be discussed further below, by disengaging each latch 252 from its catch 240. This is especially helpful when accessing the power distribution module 210, which may not be easily accessible. This allows for easy access to the electrical components in the event that one needs to be replaced, since the power distribution module 210 is typically located in a small and cluttered space. The cover 250 also can be seated in place by engaging one or more stops 238 protruding from an outer surface 237 of the component attachment portion 230. When the cover 250 is secured to the component attachment portion 230, the electrical components in the interior are protected from the elements. Optionally, one or more mounting brackets 244 can be included on the housing 220 for connecting to a complementary mating portion (not shown) located on the ATV frame to releasably secure the power distribution module 210.

Figure 12:
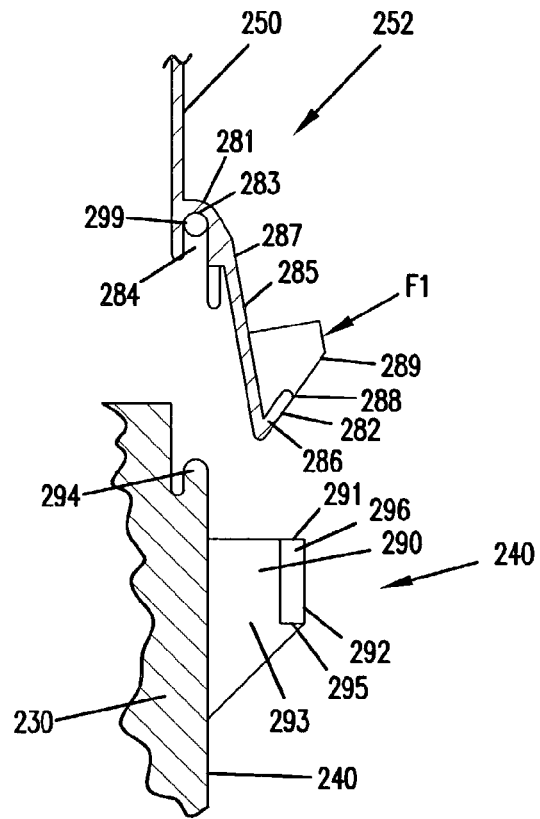
FIG. 12 is a section view of an example embodiment of a catch and latch assembly in the open position for use as a one-handed opening mechanism according to the present invention.
Figure 13:
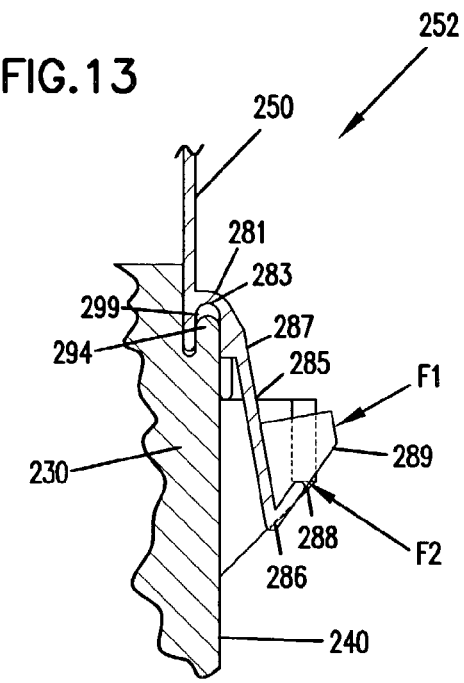
FIG. 13 is a section view of an example embodiment of a catch and latch assembly in the open position for use as a one-handed closed mechanism according to the present invention.

Referring to FIGS. 12–13, shown is an exemplary embodiment of a latch 252 and catch 240 arrangement that allows for one-handed removal and placement of the cover 250 on the component attachment portion 230, such as that shown in FIGS. 1–2. Catch 240 includes a distal end 281 and a proximal end 282. Proximal end 282 of catch 240 is attached to the cover 250. Proximal end 282 includes an arcuate section 283 that forms a pocket 284 between depending section 285 of catch 240 and the cover 250. Pocket 284 holds a sealing member 285, for example, a gasket or O-ring. Distal end 281 of catch 240 includes an engagement member 286. Catch 240 also includes a resilient portion 287 that allows the distal end 281 of catch 240 to move towards and away from the cover 250. The resilient portion 287 biases the catch 240 into an engagement position away from the cover 250 when there is no force applied to catch 240. Catch 240 also includes a finger engagement portion 288. Force F1 applied to the finger engagement portion 288 moved the distal end 281 of the catch 240 towards the cover 250. Catch 240 includes a flange member 290 extending from the wall of the component attachment portion 230. The flange member 290 includes a distal portion 291 located away from the component attachment portion 230. A protruding shoulder 292 projects from the distal end 291 of the flange member 290, forming a catch receiving area 293 there between. Latch 252 also includes an arcuate section 294 for receiving into the pocket 284 of catch 240.

FIG. 12 shows the cover 250 and component attachment portion 230 with the cover 250 disengaged. FIG. 13 shows the cover 250 engaged with the component attachment portion 230, whereby a watertight seal is formed. Beginning from the disengaged position, cover 250 is engaged with the component attachment portion 230 by inserting the distal end 281 of the catch 240 into the catch receiving area 293 of the latch 252. As the catch 240 moves into the engagement position with the latch 252, a ramp 289 engages the upper end 296 of the shoulder 292, creating an inward force F1 that moves the distal end 281 of the catch 240 towards the cover 250. The catch 240 is moved into the catch receiving area 293 until the engagement member 286 of the catch 240 clears the lower end 295 of the shoulder 292, removing the inward force F1 from the distal end 281 of the catch 240. Upon removal of the force, the resilient portion 287 of the catch 240 returns the catch 240 to the unbiased position and the engagement member 286 of the catch 240 engages the lower end 295 of the shoulder 292, securing the cover 250 onto the component attachment portion 230.

A watertight seal is formed by the sealing member 285 being compressed into the pocket 284 by the arcuate section 294 of the latch 252. Preferably, the pocket 284 runs around the entire periphery of the cover 250, and the sealing member 285 is made from one piece of material, minimizing the chance that leak points exist. Compression of the sealing member 285 also creates a compressive force that holds the engagement member 286 against the lower end 295 of the shoulder 292, creating an interference fit that keeps the cover 250 secured.

Referring to FIGS. 1–2 & 12–13, to remove the cover 250 from the component attachment portion 230 via a one-handed operation, a force F2 is applied to the finger engagement portion 288 of each catch 240, moving each catch 240 towards the cover 250 until the engagement member 286 clears the shoulder 292. The compressive force stored in the sealing member 285 then moves the cover 250 slightly away from the component attachment portion 230 and the cover 250 can be completely removed from the component attachment portion 230, allowing access to the components.

Referring generally to FIGS. 2–10, the power distribution module 210 may be mounted to a distribution harness 260. The distribution harness 260 includes a plurality of electrical conductors 262, which optionally can be housed within a sheath 269 to keep the conductors 262 in a bundle. Each electrical conductor 262 optionally may include an insulating covering (not shown). Each electrical conductor 262 goes into an associated receptacle opening 232, and is in electrical communication with an electrical component secured into receptacle openings 232 inside the housing. One or more electrical components are secured into the receptacle openings 232 in the housing 220. The electrical components can be of any type typically used in power distribution systems, such as resistors, capacitors, diodes and fuses.

Referring to FIGS. 2 and 3, the distribution harness 260 preferably is secured to the housing 220 to keep the conductors 262 in an orderly bundle. In the example embodiment shown, a first cable tie 264 secures a first section 265 of the distribution harness 260 to a first cable tie down 234 on the component attachment portion 230 of the housing 220, and a second cable tie 266 secures a second section 267 of the distribution harness 260 to a second cable tie down 236 on the component attachment portion 230 of the housing 220. Optionally, a third cable tie 268 can secure conductors in the bundle at a third section 269 between the first and second sections 265, 267 of the distribution harness 260. The third cable tie 268 also secures conductors or other elements in the distribution harness 260 that do not contain termination points into the receptacle openings 232.

Figure 9:
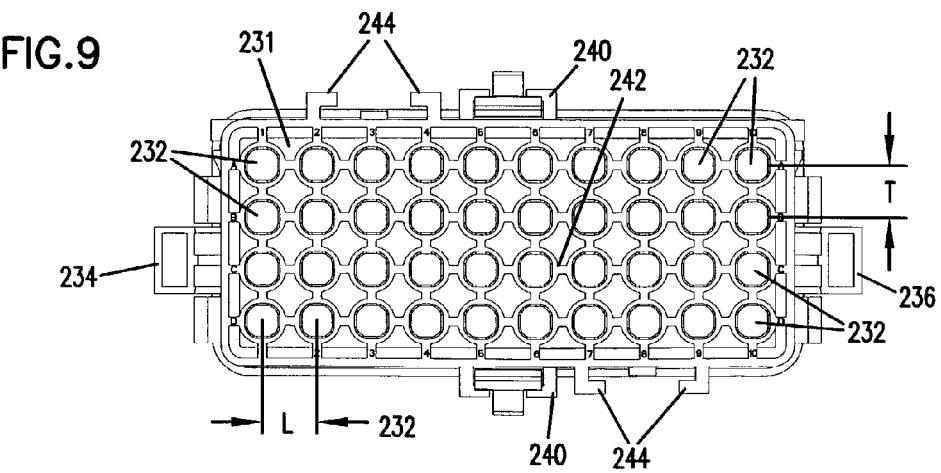
FIG. 9 is a bottom view of the power distribution module of FIG. 7.

Referring to FIG. 9, in the example embodiment shown, the receptacle openings 232 are arranged in an array 242 of rows and columns having a regular spacing. The spacing can be selected so that the array 242 is adapted to receive and secure standardized electrical components. An advantage of having the array 242 of receptacle openings 232 with a regular spacing pattern is standardized electrical components can be located and installed easily in the power distribution module. Preferably, the array 242 spacings are identical in the transverse T and lateral L directions. More preferably, the spacing is such that the receptacle openings 232 are arranged to receive ATO™ or ATC™ specification electrical components.

Referring to FIG. 11, a component arrangement guide 300 is shown. Preferably, component arrangement guide 300 is a decal. A decal allows for easy identification and location of electrical components across product and model lines by placing the decal over the receptacle opening (232 as seen in FIGS. 3 and 9). The electrical components can then be easily located and installed. In the example embodiment shown, component arrangement guide includes a schematic for placing fuses 302, diodes 304, and a relay 306 in the receptacle openings of a power distribution module. The use of the decal allows each component to be easily located and installed into its proper receptacle opening, and also allows for easy identification of a specific component location if it needs to be replaced during maintenance.

An advantage of the power distribution module of the present invention is that it can be used across a variety of models of personal recreational vehicle by using a standardized housing common to the models. A method of producing a plurality of personal recreational vehicle models is accomplished using the standardized power distribution module, thereby saving time and increasing product quality by allowing a reduction in inventory of parts specific to each model and also allowing for accurate placement of the electrical components during assembly. The power distribution module includes a plurality of receptacle openings passing from an interior to an exterior of the housing and is assembled into the personal recreational vehicle. By placing a component arrangement guide adjacent the receptacle openings on the interior side of the housing, the electrical components can be quickly and accurately installed. The component arrangement guide includes a schematic indicating placement of electrical components. Preferably, the component arrangement guide is a decal, which can be pre-printed with electrical components arranged for later installation.

When the component arrangement guide is used, the plurality of electrical components are installed into the housing into a position in the receptacle openings as indicated by the component arrangement guide. The electrical components can be installed before or after the power distribution module is placed into the personal recreational vehicle. When the electrical components and conductors are installed into the receptacle openings, each electrical component is electrically connected to an associated electrical conductor.

Each electrical component can be connected to its respective electrical conductor through its respective receptacle opening by a variety of techniques known in the art. The preferred method of connecting is to strip any insulation off the end of the conductor to be inserted into a receptacle opening. The stripped end is inserted into its respective receptacle opening. Retention of the stripped end in the receptacle opening can be enhanced by shaping the stripped end to form fingers that will snap into one or more recesses in a sidewall of the receptacle opening, thereby locking the stripped end into the receptacle opening. If necessary, removal of the stripped end from its receptacle opening is accomplished by using an extraction tool that is inserted into the receptacle opening opposite the electrical conductor side to push the conductor out of the receptacle opening.

Preferably, the electrical conductors are installed before the electrical components. After each electrical conductor is inserted into its respective receptacle opening, each electrical component is inserted into its appropriate location in the power distribution module, as indicated by the component arrangement guide. Preferably, each electrical component will have male-blade terminals that are inserted into their respective receptacle openings and the terminals are held into the receptacle openings using a friction or interference fit so that the electrical components will not fall out during operation. By using a friction fit, an operator can remove a defective electrical component using only fingers and no special tool is needed.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, power distribution module can include receptacle openings in more than one wall of the housing. Numerous other changes may be made which will readily suggest themselves to those skilled in the art and which are encompassed in the spirit of the invention disclosed and as defined in the appended claims.

What is claimed is:

1. A power distribution module for a personal recreational vehicle comprising:
    a housing defining an interior, including a component attachment portion and a cover, the cover comprising a first surface substantially surrounding the perimeter thereof, the first surface conforming to a first edge surrounding the perimeter of the component attachment portion, the component attachment portion comprising a fastener secured thereto proximate the first edge thereof, the fastener selectively securing the component attachment portion to the cover having the first surface of the cover in engagement with the first edge of the component attachment portion, the housing further including a plurality of receptacle openings in a wall in the component attachment portion, wherein the receptacle openings are spaced-apart in rows and columns of openings, the spacing between the rows and the spacing between the columns being substantially the same for receiving and securing at least one electrical component within the housing across multiple rows or across multiple columns of openings; and
    a distribution harness having a plurality of electrical conductors, wherein the electrical conductors electrically cooperate with the receptacle openings to connect to the at least one electrical component, wherein the conductors are adapted to distribute power.

2. The power distribution module of claim 1, wherein the receptacle openings are spaced-apart in an array.

3. The power distribution module of claim 1, wherein the wall includes at least three columns and at least six rows.

4. The power distribution module of claim 1, wherein the cover is a removable cover.

5. The power distribution module of claim 3, wherein the cover is configured to be removable with one hand by a user.

6. The power distribution module of claim 1, further including a plurality of electrical components, each electrical component seated in at least one receptacle opening, and wherein the electrical components are selected from a group comprising diodes, relays, circuit breakers, and fuses.

7. The power distribution module of claim 1, wherein the housing further includes a component arrangement guide located adjacent the wall having the receptacle openings, wherein the component arrangement guide indicates the location of the electrical components to be integrated with the harness.

8. The power distribution module of claim 7, wherein the component arrangement guide is a decal.

9. The power distribution module of claim 1, wherein the housing is waterproof when the cover is secured to the component attachment portion.

10. The power distribution module of claim 1, further including: a toothed strip having a latch secured thereto surrounding the harness and a portion of the housing the toothed strip having a portion thereof in engagement with the latch for securing the harness to the housing.

11. A power distribution module for a personal recreational vehicle comprising:
    a housing defining an interior, the housing comprising
        a cover defining an opening having a first surface extending along the perimeter thereof;
        a component attachment portion comprising an outer wall surrounding a plurality of connector receptacles, the outer wall having a first edge surrounding the perimeter thereof and substantially conforming to the first surface of the cover, the component attachment portion having a fastener secured to the outer wall thereof proximate the first edge, the fastener selectively securing the component attachment portion to the cover having the first edge of the outer wall in engagement with the first surface; and
    a distribution harness having a plurality of electrical conductors, wherein the electrical conductors electrically cooperate with the connector receptacles to connect to at least one electrical component, the conductors being adapted to distribute power.

12. The power distribution module of claim 11, wherein the fastener comprises a sleeve having an upper end, a lower end, and a slot extending therealong, the sleeve being secured to the outer wall, the cover comprising a tab insertable in the upper end of the sleeve and having a hooked portion proximate the lower end thereof selectively engaging the lower end of the slotted sleeve and extending toward the slot, the tab further comprising a projection secured thereto and extending through the slot when the tab is positioned within the sleeve.

13. The power distribution module for a personal recreational of claim 12, wherein the component attachment portion further comprises a first tie-down projecting from the outer wall, a first cable-tie encircling the first tie-down and distribution harness to secure the component attachment portion to the distribution harness.

14. The power distribution module of claim 13, wherein the power distribution module further comprises a second tie-down projecting from the outer wall opposite the first tie-down, a second cable-tie encircling the second tie down and the distribution harness.

15. The power distribution module of claim 14, wherein the distribution harness the outer wall rests on the distribution harness.

16. The power distribution module of claim 15, wherein the distribution harness comprises a first and second bundled portions positioned proximate the first and second tie-downs.

17. The power distribution module of claim 16, wherein the outer wall comprises a continuous band of material encircling the component attachment portion, the component attachment portion being substantially planar and the band of material having a substantially constant height in a direction perpendicular to the component attachment portion.

18. The power distribution module of claim 17, wherein the outer wall further comprises a second edge surrounding the perimeter of the outer wall, the component attachment located between and spaced a substantial distance from the first and second edges.

19. A power distribution module comprising:
    a housing defining an interior, the housing comprising
        a cover;
        a component attachment portion comprising an outer wall surrounding a plurality of connector receptacles, the component receptacles being arranged equally spaced rows and equally spaced columns, the receptacles having an upper receiver and a lower receiver the cover securing to the component attachment portion over the upper receivers;
    a plurality of electrical components each having at least two leads inserted into the upper receivers of the component receptacles;
    a distribution harness having a plurality of electrical conductors, wherein the electrical conductors inserting into the lower receivers to connect the electrical conductors to the plurality of components.

20. The power distribution module of claim 19, wherein the housing further includes a component arrangement guide located adjacent the component attachment portion, wherein the component arrangement guide indicates the location of the electrical components to be integrated with the harness.

21. The power distribution module of claim 20, wherein the component arrangement guide is a decal.

22. The power distribution module of claim 19, wherein the component attachment portion comprising an outer wall surrounding the plurality of connector receptacles, the outer wall having a first edge surrounding the perimeter thereof and substantially conforming to the a first surface of the cover, the component attachment portion having a fastener secured to the outer wall thereof proximate the first edge, the fastener selectively securing the component attachment portion to the cover having the first edge of the outer wall in engagement with the first surface.

23. The power distribution module of claim 19, wherein the upper receivers are configured to receive standard electrical connectors.

* * * * *